Oct. 26, 1926.          1,604,690
C. E. HALABY
NUT LOCKING DEVICE
Filed Nov. 25, 1925
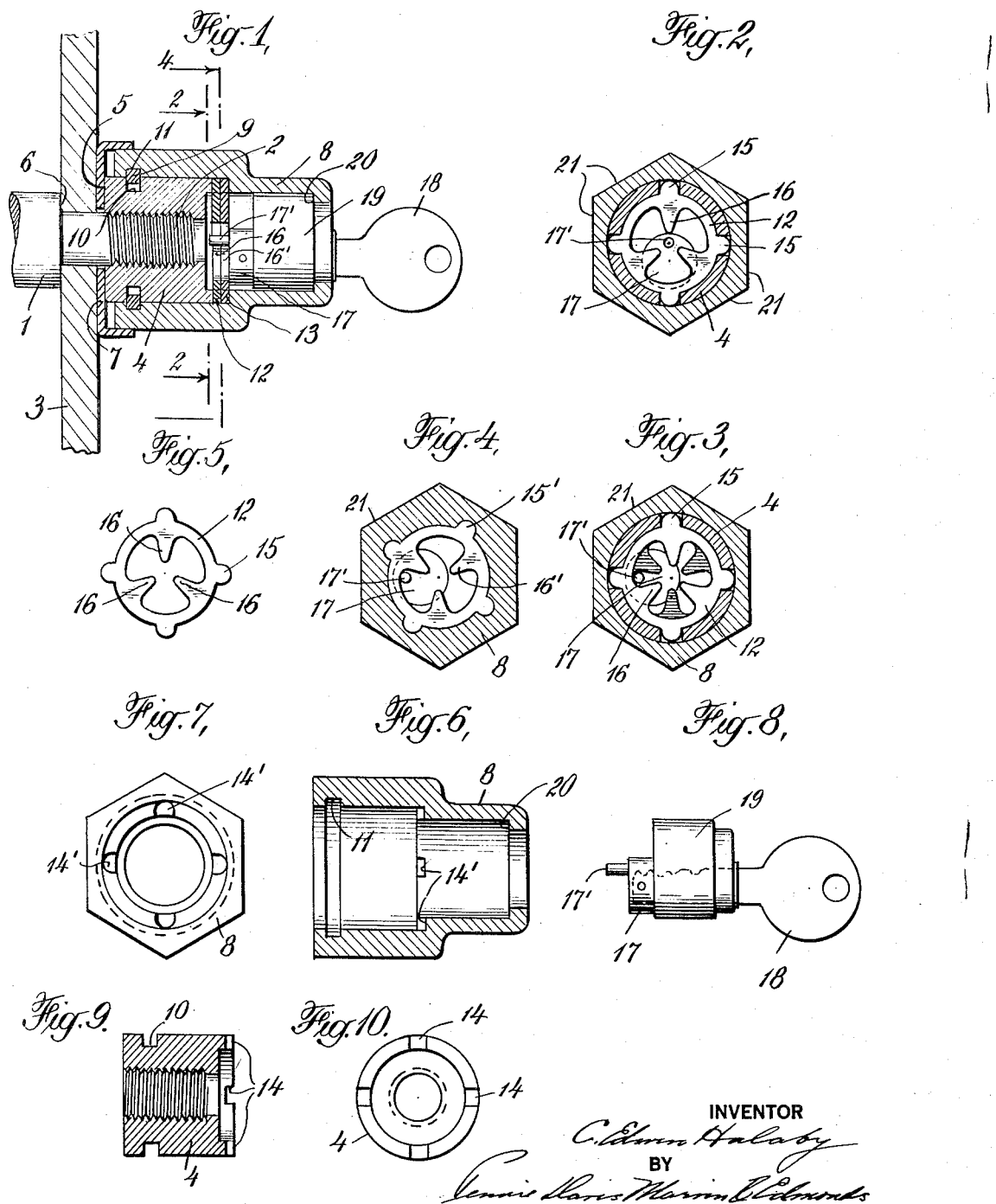
INVENTOR
C. Edmn Halaby
BY
ATTORNEYS Patented Oct. 26, 1926.

1,604,690

UNITED STATES PATENT OFFICE.

CAMILE EDWIN HALABY, OF NEW YORK, N. Y.

NUT-LOCKING DEVICE.

Application filed November 25, 1925. Serial No. 71,236.

My invention relates generally to theft-preventing devices, and particularly to a type of such devices wherein a rotary member such as a nut is utilized to retain an article on a screw, post or similar mounting.

The general object of my invention is to provide such a device for general application but adapted particularly for use as a lock for retaining spare wheels on spare wheel supports without requiring any change or special fitting in the supports or mountings which ordinarily constitute part of the standard equipment of an automobile.

The general object of my invention also includes the provision of a simple device which will prevent the unauthorized removal of a nut or similar element from its mounting.

In general, my improved device comprises what may be called a retaining unit which may be provided with a portion equivalent to the threaded portion of a nut, and an operating unit adapted to conceal or enclose the retaining unit and by means of which the retaining unit can be turned or rotated when the two units are interconnected. I prefer to provide lock mechanism for controlling the connection between the operating unit and the retaining unit and I prefer to construct and arrange these units so that the retaining unit can be rotated only when the lock mechanism is actuated to interconnect the two units. In other words, when the retaining unit is locked or rendered inaccessible, the operating unit is free to turn or rotate with respect to the retaining unit.

The various objects and advantages of my invention can be best understood by considering the following detailed description which is to be taken in conjunction with the accompanying drawings in which—

Figure 1 is a vertical section view of one embodiment of my improved device.

Figure 2 is a transverse section line 2—2 of Figure 1.

Figure 3 is a transverse section taken on line 2—2 of Figure 1, showing the several parts in positions different from those shown in Figure 2.

Figure 4 is a transverse section taken on line 4—4 of Figure 1.

Figure 5 is an elevation of one part of this embodiment of my invention.

Figure 6 is a sectional view of another part of this embodiment of my invention.

Figure 7 is an end elevation of the part shown in Figure 6.

Figure 8 is an elevation of the locking mechanism forming part of this embodiment of my invention.

Figure 9 is a vertical section view of part of the retaining unit and

Figure 10 is an end elevation of the part shown in Figure 9.

In Figure 1 I have illustrated a mounting piece or post 1 having a threaded shank 2. This mounting piece may be part of the mounting ordinarily provided on some portion of an automobile for the purpose of supporting a spare wheel or tire rim. A portion of such a wheel or rim is indicated diagrammatically at 3. My improved theft-preventing device is adapted to secure a member such as that illustrated at 3 to a suitable mounting such as that illustrated at 1 in such a manner that these two parts cannot be separated except by manipulating the lock mechanism which controls the connection between the several parts of the device.

At 4 in Figure 1, I have illustrated a cylindrical member having internal screw-threads adapted to engage the threaded stud or shank 2. One end 5 of this member 4 is adapted to clamp the part 3 against the shoulder 6 of the mounting piece 1 either directly or through a suitable washer 7. A housing member 8 is adapted to enclose the outer end of the screw-threaded member 4 and the cylindrical exterior portion of this member as well. The housing member 8 is preferably secured to the screw-threaded member 4 in such a manner that these two parts may rotate relative to each other but cannot be displaced longitudinally with respect to each other. A suitable securing means for this purpose consists of an expansion ring 9 fitting in grooves 10 and 11 in the threaded member 4 and the housing 8 respectively. This expansion ring can be compressed within the groove 10 while the housing member 8 is being slipped over the threaded member 4 and when the grooves 10 and 11 register with each other, the ring 9 expands and interlocks these two parts.

In order that the housing member 8 can be used as a means for turning or rotating the threaded member 4, I have provided one or more projections on the housing member and on the screw-threaded member, and means for interconnecting these projections. While these projections may be formed in various ways, yet I prefer to provide separate members or plates 12 and 13 which can be fixed with respect to the housing and the screw-threaded member. Some means is provided for preventing relative rotation between the plate 12 and the screw-threaded member 4. One way of accomplishing this result is to provide a screw-threaded member 4 with one or more recesses as illustrated at 14 in Figures 9 and 10, and to provide the member 12 with a corresponding number of lugs or projections 15 adapted to fit in these recesses. A plate 12 is provided with one or more portions constituting abutments. These may be in the form of radial projections which may extend toward the axis of the cylindrical threaded member 4. Such projections are illustrated at 16.

The plate or disc 13 which is associated with the housing 8 may be of a similar form to that of the plate 12 just described or it may be of different form. The important consideration is to provide these two plates with projections or portions which can be interconnected in a convenient manner so as to interlock the housing 8 and the threaded portion 4 against relative rotation. I prefer to construct the plate 13 in a form identical with plate 12 for, in this manner, the manufacturing cost can be reduced. I have illustrated a plurality of recesses 14' within the housing member 8 adapted to receive the lugs or projections 15' on the plate 13. One or more projections 16' extend toward the axis of the housing member 8, which in the embodiment illustrated in the drawing, coincides with the axis of the screw-threaded member 4. The two plates 12 and 13 are thus arranged side by side and it will be understood that when the housing member 8 is rotated, the plate 13 is carried with it. If some means is provided for interconnecting the lugs or projections 16' with the corresponding lugs 16 on the plate 12, then rotation of the housing 8 will produce rotation of the screw-threaded member 4. I have illustrated such a means in the form of a pin 17' which can be moved by a rotary motion into or out of engagement with the lugs 16 and 16'. This pin is simply a means for interconnecting or interlocking the lugs 16 with the corresponding lugs 16' and while I have illustrated a particular mounting for the pin 17' yet it will be understood that my invention includes any suitable arrangement for bringing about the desired result. The pin 17' is shown connected to a locking cylinder 17 which can be rotated only by means of a key 18. A cylinder 19 enclosed within the housing member 8 carries locking mechanism of any ordinary construction. I prefer to provide some means such as the shoulder 20 on the housing 8 for preventing the locking cylinder 19 from being withdrawn from the exposed end of the housing.

Upon referring to Figures 1 to 4, inclusive, it will be noted that the pin 17' can be moved from a position coinciding at least approximately with the axis of the threaded member 4 into a position near the circumference of this threaded member. It will also be noted that the projections 16 and 16' on the plates 12 and 13, while extending toward the axis of the screw-threaded member 4 do not come in contact with the pin 17' when it is in the position shown in Figures 1 and 2; that is, near the axis of the screw-threaded member 4. It is thus apparent that when the pin 17' occupies the position shown in Figures 1 and 2 (and the locking mechanism is designed so that the pin can be locked in this position) the housing 8 can be rotated without imparting any rotary movement to the screw-threaded member 4. When, however, the pin 17' has been moved eccentrically with respect to the housing member 8 to such an extent that it is capable of engaging any one of the lugs 16, the rotation of the housing 8 will cause the screw-threaded member 4 to rotate. When the pin 17' occupies such a position as that just described, rotation of the housing 8 causes the pin to interlock or interconnect one of the lugs 16 with one of the lugs 16' and in this manner a turning force is applied to the screw-threaded member 4 through the plate 12 by means of the plate 13 which is secured to the housing 8. Thus where a member such as that illustrated at 13 is used for the purpose of transmitting a force between the housing 8 and the plate 12, the only force exerted on the pin 17' is a shearing force between these two members.

In order that a turning force of considerable magnitude can be applied to the housing 8, I prefer to provide two or more plane surfaces 21 which can be easily gripped by a suitable wrench.

I prefer to construct the washer 7 so that it is substantially cup-shaped as shown in Figure 1, the dimensions of this member being preferably such that the washer not only covers the base of the threaded member 4 but also conceals the adjacent edge of the housing 8. In this way, dust and dirt can be prevented from gaining access to whatever clearance space may exist between the housing member 8 and the threaded member 4. It will be understood, of course, that washers of other shape can be employed or, in fact, the washer may be omitted if so desired without sacrificing all of the advantages of my invention.

My improved device can be made in large quantities at low cost because it consists of simple, easily constructed parts which can be readily assembled by unskilled labor. The simplicity of assembling the improved device is at once clear upon considering the fact that it is merely necessary to insert the locking mechanism 19 into the housing 8 until it occupies the position shown in Figure 1; the plate 13 is then inserted in the housing member with the lugs 15' engaging the recesses 14'; the plate 12 is similarly adjusted on the threaded member 4; and then when the expansion ring 9 is compressed within the groove 10 in the threaded member 4, the threaded member can be inserted in the housing 8 until the expansion ring 9 interlocks these two parts. The device is then ready for use and it will be understood that the locking mechanism controls the position of the engaging means 17' so that the housing 8 either rotates freely on the threaded member 4 or is interconnected therewith so that motion can be imparted to the threaded member by means of the housing member.

It is to be understood that the various details of my invention can be modified and in some instances even eliminated without sacrificing all of the advantages of my invention and that, accordingly, the invention is not limited to the particular embodiment illustrated and described but includes such modifications thereof as fall within the scope of the appended claims.

I claim:

1. A device of the type described, comprising a retaining unit adapted to be secured to a suitable mounting by rotary movement, and having a portion constituting an abutment, an operating unit associated with said retaining unit and having a portion constituting a projecting abutment, and engaging means for interconnecting said units by engagement with said abutments of the said units to permit rotation of the retaining unit by the operating unit.

2. A device of the type described, comprising a retaining unit adapted to be secured to a suitable mounting by rotary movement, and having a radial projection constituting an abutment, an operating unit associated with said retaining unit and having a radial projection constituting an abutment, and engaging means for interconnecting the said abutments to permit rotation of the retaining unit by the operating unit.

3. A device of the type described, comprising a retaining unit adapted to be secured to a suitable mounting by rotary movement, and having a portion constituting a projecting abutment, an operating unit associated with said retaining unit and having a portion constituting a projecting abutment, and engaging means for interconnecting the said portions of said units by simultaneously engaging said abutments, and locking mechanism for actuating said engaging means.

4. A device of the type described, comprising a retaining unit adapted to be secured to a suitable mounting by rotary movement, and having a radial projection constituting an abutment, an operating unit associated with said retaining unit and having a radial projection constituting an abutment, and engaging means eccentrically mounted with respect to said operating unit and adapted to interconnect said radial projections by rotary movement to permit rotation of the retaining unit by the operating unit.

5. A device of the type described, comprising a retaining unit adapted to be secured to a suitable mounting by rotary movement, and having a radial projection constituting an abutment, an operating unit associated with said retaining unit and having a radial projection constituting an abutment, and engaging means eccentrically mounted with respect to said operating unit and adapted to be rotated to interengage said radial projections to permit rotation of the retaining unit by the operating unit, the said operating unit enclosing the retaining unit and the said engaging means being concealed within the said operating unit.

6. A device of the type described, comprising a retaining unit adapted to be secured to a suitable mounting by rotary movement, and having a radial projection constituting an abutment, an operating unit associated with said retaining unit and having a radial projection constituting an abutment, and engaging means eccentrically mounted with respect to said operating unit and adapted to be rotated to interconnect said radial projections to permit rotation of the retaining unit by the operating unit, the said operating unit being mounted for co-radial rotation with respect to said retaining unit and enclosing the same, and the said engaging means being concealed within the operating unit.

7. A device of the type described, comprising a cylindrical retaining unit adapted to be secured to a suitable mounting by rotary movement and having a projection extending toward the axis of said unit, an operating unit associated with said retaining unit and having a projection extending toward the axis of said retaining unit, engaging means movable into and out of engagement with said projections, and means for locking said engaging means near the axis of said retaining unit and out of engagement with said projections.

8. A device of the type described, comprising a retaining unit including a member adapted to be secured to a suitable mounting by rotary movement and having a recess therein, and a member having a portion adapted to fit in said recess and a projection constituting an abutment; an operating unit associated with said retaining unit and having a portion constituting an abutment, and engaging means for interconnecting the said projection and the said portion of the operating unit to permit rotation of the retaining unit by the operating unit.

9. A device of the type described, comprising a retaining unit including a member adapted to be secured to a suitable mounting by rotary movement and having a recess therein and a member having a portion adapted to fit in said recess and a projection constituting an abutment; an operating unit associated with said retaining unit and including a member having a recess therein and a member having a portion adapted to fit in said recess and a projection constituting an abutment; and engaging means for interconnecting the said projections to permit rotation of the retaining unit by the operating unit.

10. A device of the type described, comprising a retaining unit including a member adapted to be secured to a suitable mounting by rotary movement and having a recess therein and a member having a portion adapted to fit in said recess and a projection constituting an abutment; an operating unit associated with said retaining unit and including a member having a recess therein and a member having a portion adapted to fit in said recess and a projection constituting an abutment; and engaging means mounted for eccentric rotation with respect to the recessed member of said operating unit and adapted to interconnect the said projections to permit rotation of the rotating unit by the operating unit.

11. A device of the type described, comprising a retaining unit including a cylindrical member adapted to be secured to a suitable mounting by rotary movement and having a plurality of radially disposed recesses therein, and a member having a plurality of lugs adapted to fit in said recesses and a plurality of pointed projections extending toward the axis of said cylindrical member; an operating unit enclosing said retaining unit and including a member having a plurality of radially disposed recesses therein, and a member having a plurality of lugs fitting in said recesses and a plurality of pointed projections extending toward the axis of said cylindrical member; engaging means comprising a pin mounted for eccentric rotation with respect to said second recessed member, whereby the said projections can be interconnected, and key operated mechanism for actuating said engaging means.

12. A device of the type described comprising a retaining unit including a cylindrical member adapted to be secured to a suitable mounting by rotary movement, an operating unit enclosing one end and the cylindrical exterior of said cylindrical member, means concealed by said units for preventing relative longitudinal movement of said units while permitting relative rotary movement thereof, means for interlocking said units to permit rotation of one by the other and a cup-shaped washer for enclosing the other end of said cylindrical member and the adjacent edge of said operating unit.

13. A device of the type described comprising a retaining unit adapted to be secured to a suitable mounting by rotary movement and having a portion constituting an abutment, an operating unit enclosing at least a portion of said retaining unit, a radially projecting abutment in said operating unit, and a pin carried by a member eccentrically mounted in said operating unit, said pin being movable with said member to an eccentric position for engagement with both of said abutments, whereby motion can be imparted to the retaining unit by the operating unit.

In testimony whereof I affix my signature.

C. EDWIN HALABY.